US010884763B2

(12) United States Patent
Albu et al.

(10) Patent No.: US 10,884,763 B2
(45) Date of Patent: Jan. 5, 2021

(54) LOADING NEW CODE IN THE INITIAL PROGRAM LOAD PATH TO REDUCE SYSTEM RESTARTS

(71) Applicant: International Business Machines Corporation, Armonk, NY (US)

(72) Inventors: Philip M. Albu, Rochester, MN (US); Robert Miller, Rochester, MN (US); Kiswanto Thayib, Rochester, MN (US); Aaron T. Albertson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 16/111,914

(22) Filed: Aug. 24, 2018

(65) Prior Publication Data
US 2020/0065120 A1 Feb. 27, 2020

(51) Int. Cl.
*G06F 15/177* (2006.01)
*G06F 9/445* (2018.01)
*G06F 8/65* (2018.01)
*G06F 9/4401* (2018.01)

(52) U.S. Cl.
CPC ............ *G06F 9/44521* (2013.01); *G06F 8/65* (2013.01); *G06F 9/4406* (2013.01); *G06F 9/4401* (2013.01)

(58) Field of Classification Search
CPC ................................ G06F 9/44521; G06F 8/65
USPC .......................................................... 713/2
See application file for complete search history.

(56) References Cited

U.S. PATENT DOCUMENTS

| 5,257,368 A | * | 10/1993 | Benson ................. G06F 15/161 707/999.001 |
| 6,044,461 A | * | 3/2000 | Agha ........................ G06F 8/70 713/1 |
| 7,171,674 B2 | | 1/2007 | Arrouye et al. |
| 7,861,117 B2 | | 12/2010 | Coronado et al. |
| 8,261,050 B2 | | 9/2012 | Bavaria et al. |

(Continued)

OTHER PUBLICATIONS

Wei Dong, Yunhao Liu, Chun Chen, Lin Gu, and Xiaofan Wu, "Elon: Enabling efficient and long-term reprogramming for wireless sensor networks," ACM Transactions on Embedded Computing Systems (TECS)—Regular Papers, vol. 13 Issue 4, Nov. 2014, Article No. 77, ACM New York, NY, USA.

(Continued)

*Primary Examiner* — Volvick Derose
(74) *Attorney, Agent, or Firm* — Patterson + Sheridan, LLP (57) ABSTRACT

Method and apparatus for loading new code in the initial program load (IPL) path to reduce system restarts may be provided by receiving a new component for an operating system (OS) running on a computing device; identifying a given component of the OS that is currently running as corresponding to the new component; updating a header of the given component to indicate that the given component is to-be-updated a filepath for the new component; upon initializing the operating system during a subsequent boot of the computing device, checking the header of the given component when loading the given component from an IPL path for the OS to determine that the given component is to-be-updated, and in response: loading the new component into the IPL path according to the filepath within the header of the given component; removing the given component from the IPL path; and executing the new component.

20 Claims, 4 Drawing Sheets

(56) References Cited

U.S. PATENT DOCUMENTS

| | | | |
|---|---|---|---|
| 9,047,162 B2 | 6/2015 | Ward et al. | |
| 2001/0014892 A1* | 8/2001 | Gaither | G06F 16/192 |
| 2003/0033441 A1* | 2/2003 | Forin | G06F 9/44521 |
| | | | 719/315 |
| 2003/0074598 A1* | 4/2003 | Bossen | G06F 11/142 |
| | | | 714/5.11 |
| 2004/0054785 A1* | 3/2004 | Driever | H04L 12/00 |
| | | | 709/228 |
| 2004/0250057 A1* | 12/2004 | Fujita | G06F 9/4406 |
| | | | 713/1 |
| 2005/0132179 A1* | 6/2005 | Glaum | G06F 11/1433 |
| | | | 713/1 |
| 2005/0216904 A1* | 9/2005 | Needham | G06F 8/656 |
| | | | 717/168 |
| 2006/0036654 A1* | 2/2006 | Abdallah | G06F 8/658 |
| 2008/0141010 A1* | 6/2008 | Crowell | G06F 11/2289 |
| | | | 712/226 |
| 2010/0235442 A1* | 9/2010 | Zhang | G06F 9/4416 |
| | | | 709/203 |
| 2011/0022571 A1* | 1/2011 | Snyder | G06F 9/44526 |
| | | | 707/692 |
| 2012/0174124 A1* | 7/2012 | Ward | G06F 8/71 |
| | | | 719/331 |
| 2018/0246710 A1* | 8/2018 | Kim | G06F 8/65 |

OTHER PUBLICATIONS

Kenichi Kourai, "Fast and correct performance recovery of operating systems using a virtual machine monitor," VEE 11 Proceedings of the 7th ACM SIGPLAN/SIGOPS international conference on Virtual execution environments, pp. 99-110.

* cited by examiner

LOADING NEW CODE IN THE INITIAL PROGRAM LOAD PATH TO REDUCE SYSTEM RESTARTS

BACKGROUND

The present disclosure relates to improvements to the functionality of computing devices, and more specifically, to computing systems using operating systems that can dynamically load programs, libraries, and/or modules.

An Initial Program Load (IPL) Path is the sequence of computer-readable instructions loaded into a computing device's main memory to initialize the Operating System (OS) on the computing device. New code for the purpose of a patch or update is packaged into a component of an OS. When new a component that is part of the IPL path is loaded on to the computing device, the computing device will generally need to restart two times; on the first restart the old code runs to incorporate the new code into the IPL, and on the second restart the new code may run. Once the new code is loaded, unless all running instances of the old code are ended, then it is possible to have old and new instances of the code running concurrently, which may cause problems. For example, the new code uses an updated data structure that the old code does not, or the old code calls a routine that was removed in the new errors may occur. Some programs may avoid requiring a second restart if no instances of processes affected by the updated code are running after the first restart; however, the processes of an OS in the IPL path cannot avoid being run at boot, leaving this workaround unavailable for updates to components of the OS (e.g., a task/job scheduler). Other programs may delay requiring a second restart by padding the data in the components in the IPL path and using a conversion routine between the old and new code after the first restart until a later restart is performed (e.g., for some other reason to co-schedule the downtime). The conversion routine may add significant overhead to processing commands between the old and new code, and merely delays the requirement to restart the computing device twice.

SUMMARY

According to one embodiment of the present invention, a method for loading new code in the initial program load path to reduce system restarts is provided, the method comprising: receiving a new component for an operating system running on a computing device; identifying a given component of the operating system that is currently running as corresponding to the new component; updating a header of the given component to indicate: a status of the given component as to-be-updated; and a filepath for the new component; upon initializing the operating system during a subsequent boot of the computing device, checking the header of the given component when loading the given component from an initial program load (IPL) path for the operating system to determine that the status of the given component indicates that the given component is to-be-updated, and in response: loading the new component into the IPL path according to the filepath within the header of the given component; removing the given component from the IPL path; and executing the new component.

In another embodiment described herein, a system for loading new code in the initial program load path to reduce system restarts is provided, the system, comprising: a processor; and a memory, including instructions for an operating system and for a dynamic loader that when executed by the processor enable the system to: in response to starting the system, load, by the dynamic loader, the operating system from the memory, wherein for each component of the operating system in an Initial Program Load (IPL) path that the dynamic loader loads, the dynamic loader is enabled to: in response to determining that a header field of the component indicates that the component is old, load a body field of a corresponding new component in place of a body field of the component for the operating system, wherein the corresponding new component is identified in the header field of the component.

In a further embodiment described herein, a computer program product for reducing system restarts when loading new code in an Initial Program Load (IPL) path is provided, the computer program product comprising: a computer-readable storage medium having computer-readable program code embodied therewith, the computer-readable program code executable by one or more computer processors to: receive a new component for an operating system running on a computing device; identify a given component of the operating system that is currently running as corresponding to the new component; update a header field of the given component to indicate: a status of the given component as to-be-updated; and a filepath for the new component outside of the IPL path; in response to restarting the computing device and initializing the operating system, check the header field of the given component when loading the given component from the IPL path for the operating system; in response to determining that the status of the given component indicates that the given component is to-be-updated: insert the new component to replace the given component in the IPL path; remove the given component from the IPL path; and load the new component according to the filepath.

DETAILED DESCRIPTION

The present disclosure provides systems, methods, and computer readable media that reduce downtime for computing devices when handling new code for a component in the IPL path of an OS by enabling the computing device to incorporate the new code into the OS with a single restart. A header field added to the components in the IPL path identifies whether the code in a particular component is current, new, or old. If the code is identified as old, the header identifies a path/name of the corresponding new code so that the new code is loaded instead of the old code, and so that the old code is removed from the general flow of loading the OS.

Although referred to herein as "current," "new," and "old," the various statuses of the code discussed are independent of the version number of the code run by the computing device. For example, a computing device may run version N of the code as the current code, and seek to upgrade to version N+1, downgrade to version N−1, or run an alternative (e.g., a beta or test version) version M in place of version N. In each of the preceding examples, the code of version N is marked as the "old" code and each of the versions N+1, N−1, or M may be marked as the corresponding "new" code. The new code is to be understood to be the code that will replace the current code at the next restart. Similarly, it is to be understood that the old code is the currently running code for the component, which is marked for replacement at the next restart.

Figure 1:
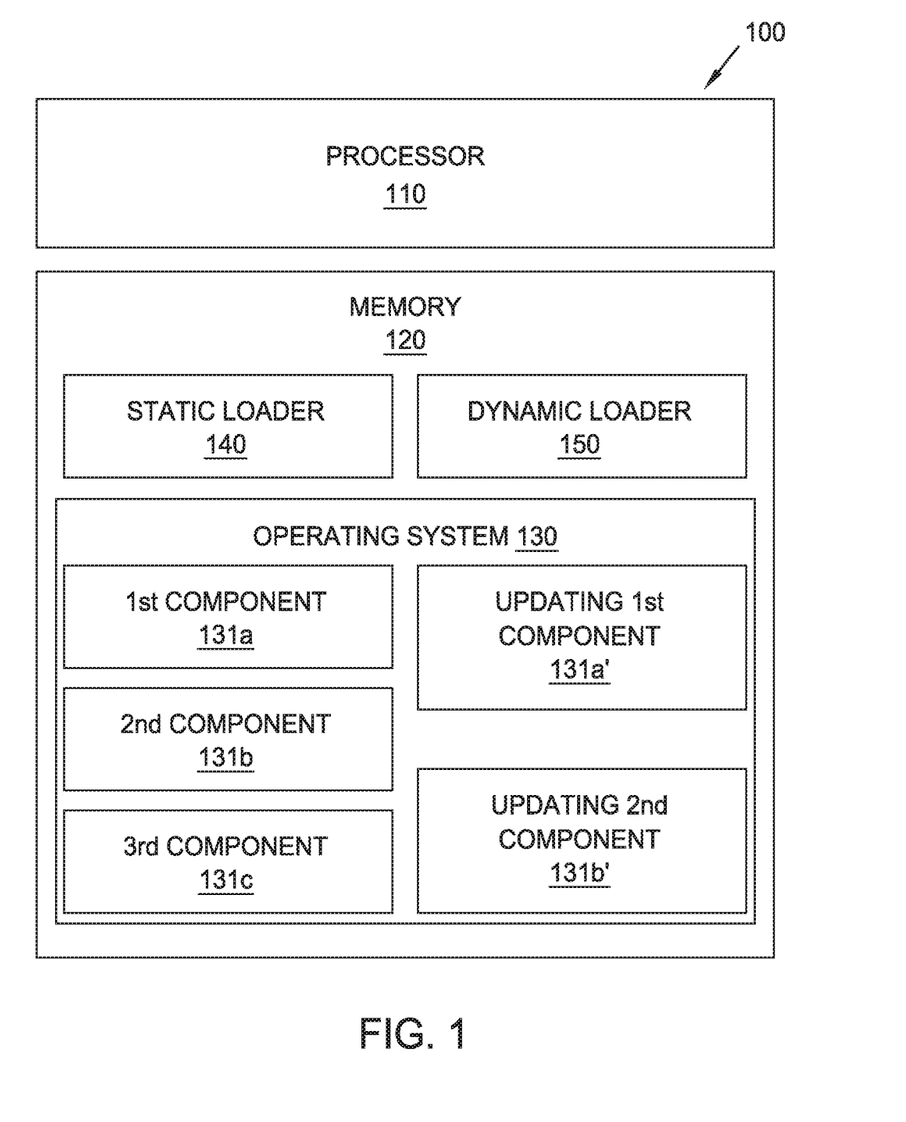
FIG. 1 illustrates a computing device configured with a dynamic loader, according to aspects of the present disclosure.

Turning now to FIG. 1, an example computing device 100 is illustrated. The computing device 100 is illustrated as including a processor 110 and a memory 120, but a computing device 100 may include more than one processor 110 or memory 120 in other embodiments. Similarly, a computing device 100 will be understood to potentially include other component devices than a processor 110 and a memory 120 (e.g., various input/output devices) that are not illustrated in FIG. 1 so as to not distract from the inventive concepts described herein. Examples of a computing device 100 include, but are not limited to: a personal computer, a laptop computer, a tablet computer, a smart phone, a feature phone, an e-reader, a video game system, and a control system for another device (e.g., a car, a medical device, a robot).

The memory 120 includes an operating system (OS 130), a static loader 140, and a dynamic loader 150. In some embodiments, the static loader 140 (e.g., a first stage boot loader) and/or dynamic loader 150 (e.g., a second stage boot loader) may be stored on a motherboard or specific chip of the computing device 100 as firmware for the computing device 100.

The OS 130 is system software that resides on the memory 120, and is loaded on startup of the computing device 100. The OS 130 includes several components 131 that include code that defines various processes, modules, sub-routines, etc. that run to provide the functionalities of the OS 130. A first component 131a, a component 131b, and updated first component 131a', an updated second component 131b', and a third component 131c are illustrated in FIG. 1, although an OS 130 may contain more or fewer components 131a-n with and without corresponding updated components 131a-n' in other embodiments. As used herein, a status used to refer to a given component 131 is based on the status of the code defining that component 131; a current component 131 includes code that is current, an updated component 131' includes code that is new and will be used to replace the old code included in an old component 131. Although both the first component 131a and the second component 131b are illustrated in FIG. 1 with corresponding updated components 131a' and 131b' (respectively), a component 131 may operate without a corresponding updated component 131'; for example, the third component 131c may be included in the memory 120 without a corresponding updated component 131'.

On startup of the computing device 100, the processor 110 loads the static loader 140 from the memory 120. The static loader 140 directs the processor 110 to load the dynamic loader 150 from the memory 120, and the dynamic loader 150 selects the components 131 of the OS 130 to load to initialize the OS 130 on startup of the computing device 100. In various embodiments, the static loader 140 or the dynamic loader 150 may also enumerate Random Access Memory (RAM), detect various devices connected to the computing device 100, load interrupt handlers for various hardware devices connected to or part of the computing device 100, load device-specific BIOS (Basic Input Output Systems) for sub-devices of the computing device 100, etc. The instructions for the static loader 140 may be hardcoded into the memory 120, but the instructions for the dynamic loader 150 may be stored as an image in a non-volatile (or battery backed-up) portion of memory 120 to allow for updates in boot order, device passwords, system time, system settings, and the like. In contrast with a static loader 140, a user may update the settings used in the dynamic loader 150 to perform the various operations of starting up the computing device 100, for example, via a setup utility at startup or by reimaging the memory 120 that stores the dynamic loader 150.

The dynamic loader 150 bootstraps the OS 130 from the memory 120 to hand over operation of the computing device 100 to the OS 130 from the static loader 140 and the dynamic loader 150. The dynamic loader 150 may be set to look for various components 131 of the OS 130 to load during startup from specified devices in the memory 120 (e.g., from a compact disk, from a hard drive if no compact disk is detected). The portions of the OS 130 that the dynamic loader 150 identifies and loads may vary in different OS 130, but includes several components 131 that the OS 130 uses to control the computing device 100 and to take over the boot process from the static loader 140 and the dynamic loader 150. These components 131 may comprise a portion or all of the code of the OS 130 and are understood to be the IPL path for the OS 130. The dynamic loader 150 identifies the components 131 to load for the OS 130 during startup based on known filepaths (including memory addresses and/or filenames) for the components 131.

When loading the OS 130 after an update to the components 131 of the OS 130, the dynamic loader 150 loads the component 131 that correspond to known filepaths in the IPL path to the processor 110 to thereby boot/initialize the OS 130. According to aspects of the present disclosure, the dynamic loader 150 reads a header portion of each component 131 in the IPL path before loading that the code of that component 131 to the processor 110. When the header indicates that the component 131 has a status of "current" or "up-to-date," the dynamic loader 150 loads the code of the given component 131. When the header indicates that the code in the component 131 has a status of "old" or "to-be-updated," the dynamic loader 150 continues to read the header to identify a filepath of a corresponding "new" or "updated" component 131'. The dynamic loader 150 loads the new code from the "new" component 131' in place of the instructions included in the "old" component 131 and before proceeding in loading subsequent components 131 in the IPL path.

In various embodiments, the dynamic loader 150 updates the IPL path to remove the old component 131 from the IPL once the new component 131' has been loaded and adds the new component 131' to the IPL path for later startups of the OS 130. In some embodiments, the old component 131 is deleted from the memory 120, while in other embodiments, the old component 131 is renamed to prevent the dynamic loader 150 from loading that old component 131 in a subsequent boot/initialization of the computing device 110. In some embodiments, an old component 131 that is renamed and retained may later be designated as a "new" component 131' to revert from the change to the IPL path that removed the old component 131. The dynamic loader 150 may also rename the "new" updated component 131' once loaded or may internally update the filepath that the dynamic loader 150 uses to find the component 131 to point to the "new" updated component 131' instead of the corresponding "old" component 131. The dynamic loader 150 may thus load the OS 130 using the "new" component 131' in a single restart of the computing device 100, without requiring an intermediary handler between the "new" and "old" code.

Figure 2:
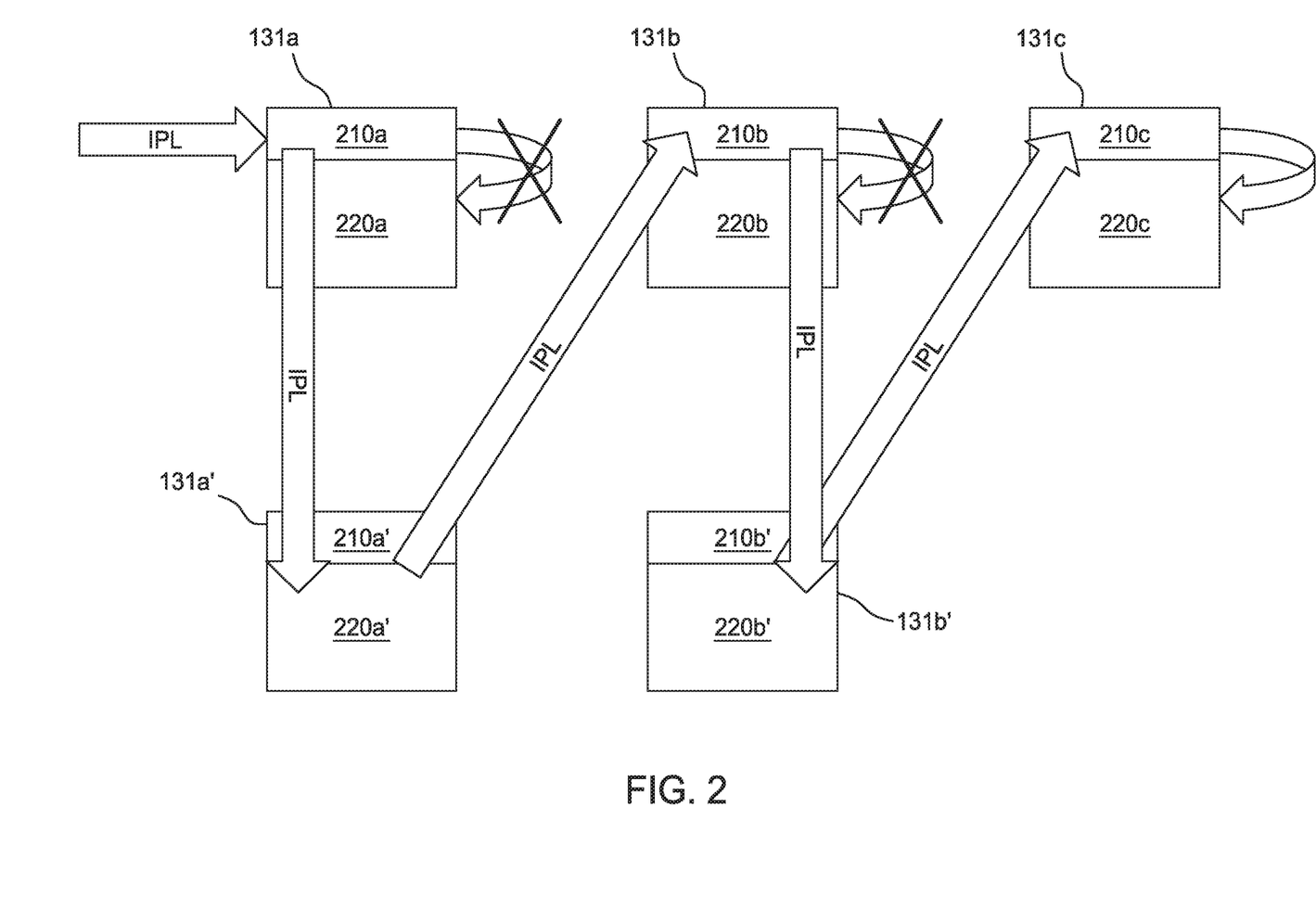
FIG. 2 illustrates a boot sequence, according to aspects of the present disclosure.

FIG. 2 illustrates a boot sequence using the components 131 in the IPL path and new components 131' corresponding to those components 131 in the IPL path. The boot sequence follows the IPL path to load the code included in the various components 131 of the OS 130. Although the present example shows three components 131 in the IPL path, different OSes 130 may include more or fewer components 131 in the IPL path in different embodiments.

In the illustrated IPL sequence, a first component 131*a*, a second component 131*b*, and a third component 131*c* are in the IPL path, and a first new component 131*a'* and a second new component 131*b'* are outside of the IPL path, but present in the memory 120 at a different file location. The dynamic loader 150 loads the code from each of the components 131 in the sequence defined by the IPL path such that, absent instructions otherwise, the dynamic loader 150 would execute the first component 131*a*, followed by the second component 131*b*, followed by the third component 131*c*, etc. to load the OS 130 into the memory 120 to allow the OS 130 to start at startup for the computing device 100. In the illustrated IPL sequence, however, each of the components 131 (and new components 131') include a header field 210 and a body field 220, which provide the dynamic loader 150 with the location of the code that the OS 130 uses in the current IPL path.

Each component 131*a-c* is illustrated with a corresponding header field 210*a-c*, and each new component 131*a-b'* is illustrated with a corresponding header field 210*a-b'*. The header field 210 includes a status indicator for the associated code for the component 131. The status indicator may be one or more status bits or a text representation that indicates whether the component 131 is "new", "old", "current", etc. so that the dynamic loader 150 may identify how to handle the component 131 during the boot sequence. The header field 210 also includes a path field, which may be populated to indicate a filepath for the dynamic loader 150 to use to load instructions for the booting OS 130.

Each component 131*a-c* is illustrated with a corresponding body field 220*a-c*, and each new component 131*a-b'* is illustrated with a corresponding body field 220*a-b'*. The body field 220 includes the instructions and code that are executable by the processor 110 to provide the functionality of the corresponding component 131 or new component 131'.

The header field 210 is loaded first by the dynamic loader 150 when loading a component 131, and is parsed to determine the status of the given component 131 being loaded. If the dynamic loader 150 determines that the header field 210 indicates that the component 131 is current or has code that is not otherwise to-be-updated, the dynamic loader 150 loads the instructions and code in the body field 220 of the current component 131 and then continues to the next component 131 in the IPL path. If the dynamic loader 150 determines that the header field 210 indicates that the component 131 is old or otherwise has code that is to-be-updated, the dynamic loader 150 continues to parse the header field 210 to identify a filepath for a corresponding new component 131' outside of the IPL path, loads the instructions and code in the body field 220' of the new component 131' instead of the instructions and code in the body field 220 of the old component 131, and updates the header field 210' to indicate the new component 131' is now current before continuing to the next component 131 in the IPL path.

In the illustrated example, the dynamic loader 150 is shown to parse the first header field 210*a*, which indicates that the first component 131*a* is old, and points to the first new body field 220*a'* of the first new component 131*a'* for the instructions and code to load for the OS 130, instead of the first body field 220*a*. After loading the instructions and code for the first new component 131*a'*, the dynamic loader 150 proceeds to load the second component 131 in the IPL path by parsing the second header field 210*b*. The second header field 210*b* in the illustrated IPL sequence also indicates that the second component 131*b* is old, and the dynamic loader 150 parses a pointer or address section to direct the dynamic loader 150 to load the instructions and code in the second new body field 220*b'* instead of the instructions and code in the second body field 220*b* before proceeding to the next component 131*c* in the IPL path. The dynamic loader 150 proceeds to load the third component 131*c* after loading the new second component 131*b'*, and parses the third header 210*c*. In the illustrated example, the third header 210*c* indicates that the third component 131*c* is "current" or otherwise not associated with a new component 131' that includes instructions and code that should be loaded instead of those included in the third component 131*c*. Therefore, the dynamic loader 150 loads the instructions and code in the IPL path in the third body field 220*c* after parsing the third header field 210*c*.

Figure 3:
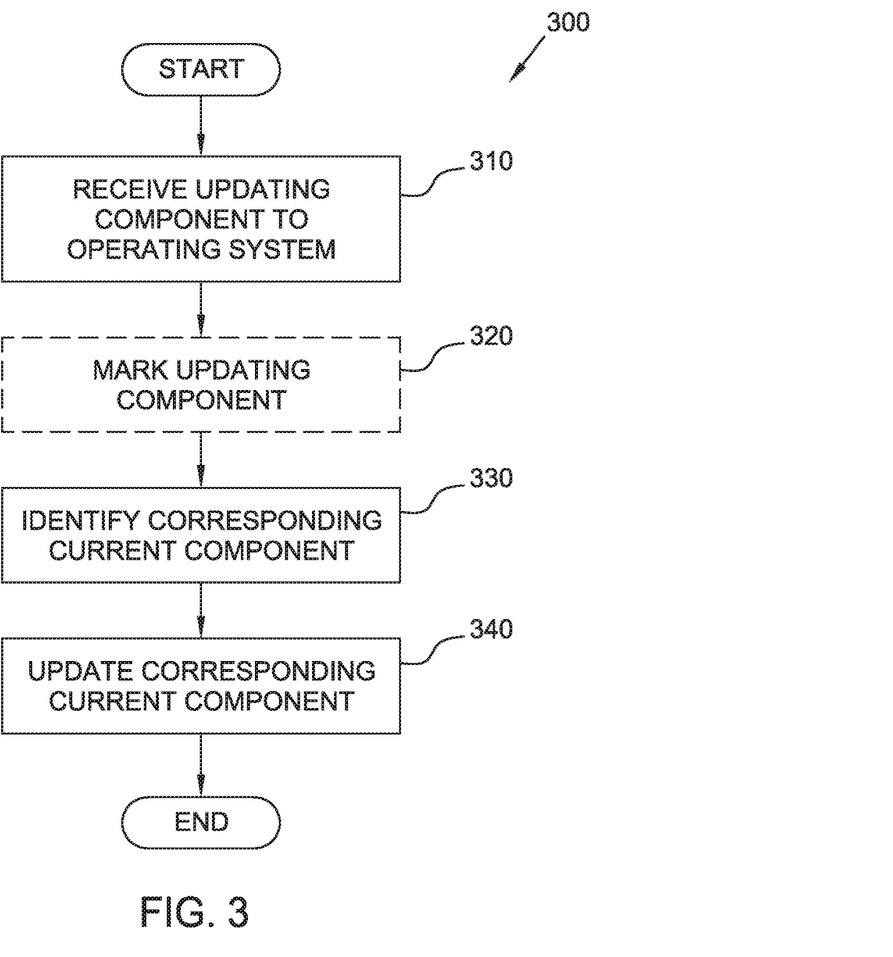
FIG. 3 is a flowchart of a method for reducing system restarts when loading new code in the initial program load path, according to aspects of the present disclosure.

FIG. 3 is a flowchart of a method 300 for reducing system restarts when loading new code in the IPL path. Method 300 begins at block 310, where the computing device 100 receives a new component 131' to implement in the OS 130, while the OS 130 is currently running as defined by a corresponding current component 131. The computing device 100 may receive the new component 131' as part of an update to the OS 130, as command to revert to an older version of the OS 130, to implement an alternative version of a corresponding component 131 (e.g., a beta, a localization), or the like during a first activation of the OS 130. In various embodiments, the current component 131 corresponding to the new component 131' may be running or may be inactive or otherwise not running when the new component 131' is received. Although method 300 provides examples related to a single new component 131', it will be appreciated that an update to the OS 130 may include several new components 131', and method 300 may be performed several times in a single operation cycle of the computing device 100 to load several new components 131' to take effect in the next operation cycle of the computing device 100 (i.e., after the next restart).

At block 310, the OS 130 optionally marks the new component 131' as "new" to replace the corresponding current component 131. In various embodiments, the new component 131' may be pre-marked as "new" by a separate device from which the new component 131' was received in block 310. In other embodiments, a retired "old" component 131 may be marked again as a "new" component 131' to replace the current component 131 (e.g., to revert the current version of the code to a prior version). To mark the updated component 131 as "new", the OS 130 may mark a header field in the new component 131' and/or rename the new component 131' to differentiate the new component 131' from the current component 131 (e.g., "TaskManager_new" corresponding to "TaskManager").

At block 330, the OS 130 identifies the component 131 that corresponds to the new component 131' received at block 310. In some embodiments, the OS 130 identifies the correspondence based on a similarity between the names of the new component 131' and the current component 131. In other embodiments, a header section of the new component 131' identifies or points to the corresponding component 131 currently in-use by the OS 130. In additional embodiments, the OS 130 receives, at block 310, an update to a registry or a directory file that maps the new component 131' to the corresponding current component 131.

At block 340, the OS 130 updates the header of the corresponding current component 131 identified in block 330 to indicate that the given component 131 is "old" or to-be-updated by the corresponding new component 131'. In various embodiments, the OS 130 sets a status bit or header sub-field to indicate that a component 131 is now "old," and the header field is updated to indicate a filepath for the dynamic loader 150 to use to load the new code in the new component 131' when the dynamic loader 150 attempts to load the corresponding component 131. For example, the OS 130 sets the header of first component 131a to point to first new component 131a' and the header of second component 131b to point to second new component 131b'. If a third component 131c does not have a corresponding new component 131' (i.e., a new component 130 corresponding to the third component 131c has not been received and processed per block 310-340 before a restart occurs), the OS 130 will leave the header field 210 of the third component 131c to indicate that the third component 131c is "current" or otherwise not associated with an update during the next restart of the computing device 100.

Method 300 may then conclude.

Figure 4:
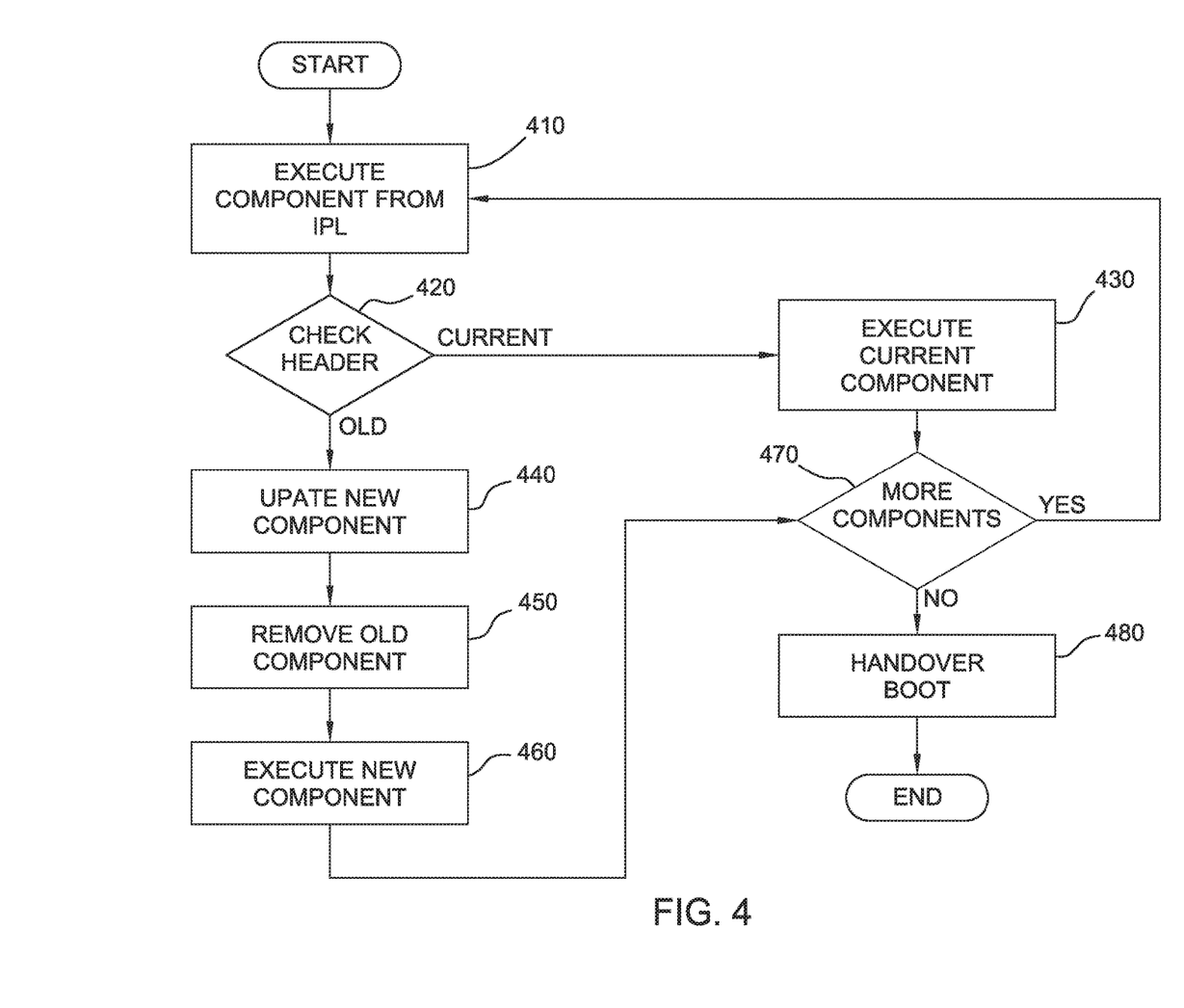
FIG. 4 is a flowchart of a method for reducing system restarts when handling newly loaded code in the initial program load path, according to aspects of the present disclosure.

FIG. 4 is a flowchart of a method 400 for reducing system restarts when handling newly loaded code in the initial program load path. Method 400 may start in response to a restart of the computing device 100 that triggers the static loader 140 to load the dynamic loader 150 as part of system startup operations. A restart may be the result of a restart command or a shutdown command followed by a start command. In some embodiments, the OS 130 requests for the computing device 100 to restart in response to receiving a new component 131' or a group of new components 131' (e.g., per method 300). In other embodiments, the OS 130 may continue running with the current and old components 131 defining the operations of the OS 130 until the user manually shuts down or restarts the computing device 100 and the OS 130. Depending on how the computing device 100 is restarted, the amount of time between shutdown and start up may vary.

In response to a restart of the computing device 100, method 400 begins at block 410, where the dynamic loader 150 begins to execute components 131 according to the IPL path to boot up the OS 130.

At block 420, the dynamic loader 150 checks the header field 210 of the given component 131 that is being loaded to determine whether the given component 131 is marked as "current" or is marked as "old."

In response to determining at block 420 that the given component 131 is indicated as "current" in the header portion, method 400 proceeds to block 430, where the instructions and code in the body field 220 of the given component 131 are executed to continue the IPL of the OS 130. In embodiments in which no component 131 are indicated as "old," the dynamic loader 150 loads every component 131 as that component 131 was loaded in the OS 130 from before the restart event that began method 400.

In response to determining at block 420 that the given component 131 is indicated as "old" in the header field 210, method 400 proceeds to block 440, where the dynamic loader 150 updates the code by inserting the new component 131' into the IPL path for use as a "current" component 131 in the next boot sequence of the OS 130 (e.g., in a subsequent restart). The dynamic loader 150 may rename or re-map the filepath of the new component 131' to the name and/or filepath used by the old component 131 in the present boot sequence (replacing the old component 131 in some embodiments). In some embodiments, header information in a header field 210 for the new component 131' is updated to change the status of the new component 131' from "new" to "current."

At block 450, the dynamic loader 150 removes the old component 131 that pointed to the new component 131' executed in block 440 from the IPL path. In various embodiments, the dynamic loader 150 renames the old component 131, but preserves the old component 131 in the memory 120 outside of the IPL path. In other embodiments, the dynamic loader 150 deletes the old component 131 from the memory 120 or allows the old component 131 to be replaced.

At block 460, the dynamic loader 150 reads the filepath for the corresponding new component 131' from the header field 210 of the given component 131 and executes the instructions from the body field 220' of the corresponding new component 131' to continue the IPL of the OS 130 with the instructions and code defined in the new component 131' instead of the instructions and code defined in the body field 220 of the component 131.

Method 400 proceeds to block 470 after block 430 or block 460 for the dynamic loader 150 to determine whether more component 131 in the IPL path are present to execute to boot the OS 130. The dynamic loader 150 may select the component 131 to load for the OS 130 in a specified order, and continue loading component 131 until the OS 130 continues with IPL, or an error occurs during startup. If additional components 131 are present in the IPL path, method 400 returns to block 410 to execute the next component 131 in the IPL path. Once every component 131 or new component 131' is executed from the IPL path, method 400 may proceed to block 480, where the dynamic loader 150 hands over remaining boot operations to the OS 130 to handle. Method 400 may then conclude having used only a single restart to implement the code in the OS 130.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, component, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
receiving a new version for an existing version a given software component of an operating system running on a computing device;
identifying the existing version of the given software component of the operating system that is currently running as corresponding to the new version of the given software component;
changing existing values within a pre-existing header of the given software component of the operating system to update:
a status of the given software component of the operating system as to-be-updated; and
a filepath for the given software component of the operating system from the existing version to the new version;
upon initializing the operating system during a subsequent boot of the computing device, checking the pre-existing header of the given software component of the operating system when loading the given software component of the operating system from an initial program load (IPL) path for the operating system to determine that the status of the given software component of the operating system indicates that the given software component of the operating system is to-be-updated, and in response:
loading the new version of the given software component of the operating system into the IPL path according to the filepath within the pre-existing header of the given software component of the operating system instead of loading the existing version of the given software component of the operating system;
removing the existing version of the given software component of the operating system from the IPL path; and
executing the new version of the given software component of the operating system.

2. The method of claim 1, wherein removing the existing version of the given software component includes one of:
deleting the existing version of the given software component from the IPL path;
renaming the existing version of the given software component to a different filepath outside of the IPL path; and
replacing the existing version of the given software component with the new version of the given software component.

3. The method of claim 1, wherein inserting the new version of the given software component to replace the existing version of the given software component in the IPL path includes renaming the new version of the given software component to match a name of the existing version of the given software component.

4. The method of claim 1, wherein inserting the new version of the given software component to replace the existing version of the given component in the IPL path includes updating a status in a header of the new version of the given software component as current.

5. The method of claim 1, wherein updating the pre-existing header of the existing version of the given software component changes the status from current to old.

6. The method of claim 1, wherein receiving the new version of the given software component for the operating system further comprises:
renaming the new version of the given software component to have a name different from the existing version of the given software component corresponding to the new version of the given software component; and
marking a status header field in the new version of the given software component as new.

7. A system, comprising:
a processor; and
a memory, including instructions for an operating system and for a dynamic loader that when executed by the processor enable the system to:
in response to starting the system, load, by the dynamic loader, the operating system from the memory, wherein for each software component of the operating system in an Initial Program Load (IPL) path that the dynamic loader loads, the dynamic loader is enabled to:
in response to determining that a pre-existing header field of an existing version of the software component indicates that the existing version of the software component is old, load a new body field of a corresponding new version of the software component in place of an old body field of the existing version of the software component for the operating system, wherein the corresponding new version of the software component is identified in the pre-existing header field of the existing version of the software component.

8. The system of claim 7, wherein the operating system is enabled to:
prior to starting the system, receive the new version of the software component for the operating system and store the new version of the software component in the memory;
identify the existing version of the software component of the operating system corresponding to the new version of the software component;
update the pre-existing header field of the currently running existing version of the software component to indicate that the currently running existing version of the software component is old; and
update the pre-existing header field of the currently running existing version of the software component to point to the new version of the software component in the memory.

9. The system of claim 7, wherein the operating system is enabled to:
mark the new version of the software component as new in a header field of the new version of the software component; and
rename the new version of the software component to a different name than the existing version of the software component.

10. The system of claim 7, wherein the memory further includes a static loader, that in response to the system restarting, loads the dynamic loader into the processor.

11. The system of claim 7, wherein the dynamic loader is further enabled to, in response to loading the new version of the software component, update a status in a header field of the new version of the software component from new to current.

12. The system of claim 7, wherein the dynamic loader is further enabled to, in response to loading the new version of the software component, rename the new version of the software component to a pre-existing name of the existing version of the software component.

13. The system of claim 7, wherein the dynamic loader is further enabled to, in response to loading the new version of the software component, remove the existing version of the software component from the IPL by at least one of:
 a renaming the existing version of the software component; and
 a deletion of the existing version of the software component.

14. The system of claim 7, wherein the dynamic loader is further enabled to:
 in response to determining that the pre-existing header field of the existing version of the software component indicates that the existing version of the software component is current, load the existing version of the software component for the operating system.

15. A computer program product for reducing system restarts when loading new code in an Initial Program Load (IPL) path, the computer program product comprising:
 a computer-readable storage medium having computer-readable program code embodied therewith, the computer-readable program code executable by one or more computer processors to:
  receive a new version for an existing version a given software component of an operating system running on a computing device;
  identify the existing version of the given software component of the operating system that is currently running as corresponding to the new version of the given software component;
  change existing values within a pre-existing header of the given software component of the operating system to indicate update:
   a status of the given software component of the operating system as to-be-updated; and
   a filepath for the given software new component of the operating system from the existing version to the new version;
  in response to restarting the computing device and initializing the operating system, check the pre-existing header field of the given software component of the operating system from the IPL path for the operating system to determine that the status of the given software component of the operating system indicates that the given software component of the operating system is to-be-updated;
  in response to determining that the status of the given software component indicates that the given software component is to-be-updated:
   insert the new version of the software component to replace the existing version of the given software component in the IPL path;
   remove the existing version of the given component from the IPL path; and
   load the new version of the given software component according to the filepath.

16. The computer program product of claim 15, wherein removing the existing version of the given software component includes one of:
 deleting the existing version of the given software component from the IPL path;
 renaming the existing version of the given software component to a different name outside of the IPL path; and
 replacing the existing version of the given software component with the new version of the given software component.

17. The computer program product of claim 15, wherein inserting the new version of the given software component to replace the existing version of the given software component in the IPL path includes renaming the new version of the given software component to match a name of the existing version of the given software component.

18. The computer program product of claim 15, wherein inserting the new version of the given software component to replace the existing version of the given software component in the IPL path includes updating a status in a header field of the new version of the given software component as current.

19. The computer program product of claim 15, wherein updating the pre-existing header of the existing version of the given software component changes the status from current to old.

20. The computer program product of claim 15, wherein receiving the new version of the given software component for the operating system further comprises:
 renaming the new existing version of the given software component to have a name different from the existing version of the given software component corresponding to the new version of the given software component; and
 marking a status in a header field of the new version of the given software component as new.

* * * * *